(12) United States Patent
Lin et al.

(10) Patent No.: US 10,884,519 B2
(45) Date of Patent: Jan. 5, 2021

(54) SCROLL WHEEL MODULE

(71) Applicants: LITE-ON ELECTRONICS (GUANGZHOU) LIMITED, Guangzhou (CN); Lite-On Technology Corporation, Taipei (TW)

(72) Inventors: Chin-Yuan Lin, Taipei (TW); Chih-Wen Su, Taipei (TW); Hong-Che Yen, Taipei (TW); Urey Deng, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 469 days.

(21) Appl. No.: 15/871,063

(22) Filed: Jan. 15, 2018

(65) Prior Publication Data

US 2018/0267629 A1    Sep. 20, 2018

Related U.S. Application Data

(60) Provisional application No. 62/472,518, filed on Mar. 16, 2017.

(30) Foreign Application Priority Data

Nov. 9, 2017   (CN) .......................... 2017 1 1095628

(51) Int. Cl.
*H01H 9/00*     (2006.01)
*G06F 3/0362*   (2013.01)

(52) U.S. Cl.
CPC ................... *G06F 3/0362* (2013.01)

(58) Field of Classification Search
CPC ...... G06F 3/0362; G06F 3/03543; G05G 1/10
USPC ........................................................... 335/205
See application file for complete search history.

(56) References Cited

U.S. PATENT DOCUMENTS

| 1,853,749 | A | * | 4/1932 | Sharpe | F16H 15/52 |
| | | | | | 475/187 |
| 5,231,892 | A | * | 8/1993 | Haight | A01B 63/111 |
| | | | | | 200/11 TW |
| 8,367,956 | B2 | * | 2/2013 | Hoess | G05G 25/04 |
| | | | | | 200/316 |
| 10,599,238 | B1 | * | 3/2020 | Wu | G06F 3/0362 |
| 2006/0022944 | A1 | * | 2/2006 | Pai | G06F 3/03543 |
| | | | | | 345/163 |
| 2006/0181556 | A1 | * | 8/2006 | Wanibuchi | B41J 11/006 |
| | | | | | 347/8 |

(Continued)

*Primary Examiner* — Shawki S Ismail
*Assistant Examiner* — Lisa N Homza
(74) *Attorney, Agent, or Firm* — JCIPRNET

(57) ABSTRACT

The invention provides a scroll wheel module, which includes an adjustment wheel, a scroll wheel and a transmission mechanism. The adjustment wheel includes an adjustment portion. The scroll wheel includes a contact portion. The transmission mechanism has a first end and a second end opposite to each other, the first end is connected to the adjustment portion of the adjustment wheel, and the second end is adjacent to the scroll wheel. When the adjustment wheel is rotated, the first end of the transmission mechanism produces a displacement relative to the adjustment portion such that the second end of the transmission mechanism applies a force to the contact. A magnitude of the force is proportional to a rotational force of the scroll wheel.

10 Claims, 7 Drawing Sheets

(56) References Cited

U.S. PATENT DOCUMENTS

| | | | |
|---|---|---|---|
| 2007/0040319 A1* | 2/2007 | Chang | B65H 7/125 |
| | | | 271/10.01 |
| 2007/0159462 A1* | 7/2007 | Yen | G06F 3/0362 |
| | | | 345/163 |
| 2007/0222753 A1* | 9/2007 | Yu | G06F 3/03543 |
| | | | 345/163 |
| 2008/0117169 A1* | 5/2008 | Chiang | G06F 3/0362 |
| | | | 345/163 |
| 2008/0174555 A1* | 7/2008 | Chiang | G06F 3/0312 |
| | | | 345/163 |
| 2009/0295725 A1* | 12/2009 | Chou | G06F 3/0362 |
| | | | 345/163 |
| 2018/0239446 A1* | 8/2018 | Lin | G06F 3/03543 |
| 2019/0094991 A1* | 3/2019 | Tsai | G06F 3/0362 |
| 2019/0094994 A1* | 3/2019 | Tsai | G06F 3/0362 |
| 2020/0272248 A1* | 8/2020 | Chiang | G06F 3/03543 |

* cited by examiner

SCROLL WHEEL MODULE

CROSS REFERENCE TO RELATED APPLICATION

This application claims the priority benefits of U.S. provisional application Ser. No. 62/472,518, filed on Mar. 16, 2017, and China application serial no. 201711095628.4, filed on Nov. 9, 2017. The entirety of each of the above-mentioned patent applications is hereby incorporated by reference herein and made a part of specification.

BACKGROUND OF THE INVENTION

1. Field of the Invention

The invention relates to a scroll wheel module, and more particularly, to a scroll wheel module applied in an input device.

2. Description of Related Art

A mouse is an input device for use with window-based interface applications which can control a display position of a cursor on a screen and start applications or execute other related functions by clicking on function buttons. Currently, the mouse is the most commonly used input device other than a keyboard is in use of personal computers. In the conventional computer mice, a rotational torque of a scroll wheel is consistent and fixed. That is, the scroll wheel module of the mouse can only provide one single section feel for a user when the scroll wheel is being rotated. However, the mouse with one single section feel can no longer satisfy demand of the user nowadays.

SUMMARY OF THE INVENTION

The invention aims to provide a scroll wheel module, which is capable of changing to a different section mode at any time based on the demand of the user so as to provide different section feel for the user.

The scroll wheel module proposed according to the embodiments of the invention includes an adjustment wheel, a scroll wheel and a transmission mechanism. The adjustment wheel includes an adjustment portion. The scroll wheel includes a contact portion. The transmission mechanism has a first end and a second end opposite to each other, the first end is connected to the adjustment portion of the adjustment wheel, and the second end is adjacent to the scroll wheel. When the adjustment wheel is rotated, the first end of the transmission mechanism produces a displacement relative to the adjustment portion such that the second end of the transmission mechanism applies a force to the contact. A magnitude of the force is proportional to a rotational force of the scroll wheel.

In one embodiment of the invention, the adjustment portion is an inclined surface, and the force is a contact force. When the adjustment wheel is rotated, the first end of the transmission mechanism produces a lateral rotational displacement through the inclined surface such that the second end of the transmission mechanism applies the contact force to and directly leans against the contact portion of the scroll wheel.

In one embodiment of the invention, the scroll wheel module further includes an elastic piece, leaning against a side of the first end of the transmission mechanism. When adjustment wheel is rotated, the first end of the transmission mechanism produces the lateral rotational displacement through the inclined surface such that the elastic piece produces an elastic deformation to change a magnitude of the contact force applied to the contact portion by the second end of the transmission mechanism.

In one embodiment of the invention, the scroll wheel module further includes a fixing mechanism, leaning against a side of the adjustment wheel relatively far away from the transmission mechanism. When the adjustment wheel is rotated, the first end of the transmission mechanism produces the lateral rotational displacement through the inclined surface, and the fixing mechanism provides a counter force to fix a position of the adjustment wheel.

In one embodiment of the invention, the scroll wheel module further includes a fixing rod and a spring. The fixing rod has a first side and a second side opposite to each other. The first side leans against a side of the adjustment wheel relatively far away from the transmission mechanism. The spring leans against the second side of the fixing rod. When the adjustment wheel is rotated, the first end of the transmission mechanism produces the lateral rotational displacement through the inclined surface, and the spring provides a counter force to fix a position of the adjustment wheel.

In one embodiment of the invention, the scroll wheel module further includes an elastic piece, leaning against a lateral surface of the second end of the transmission mechanism, and providing an elastic power to stabilize the transmission mechanism when the second end of the transmission mechanism is relatively far away from the scroll wheel.

In one embodiment of the invention, the adjustment portion is a threaded aim, the force is a contact force, and the second end of the transmission mechanism includes a plurality of friction elastic pieces. When the adjustment wheel is rotated, the first end of the transmission mechanism produces a lateral displacement through the threaded arm such that the friction elastic pieces apply the contact force to and directly push against the contact portion.

In one embodiment of the invention, the scroll wheel includes a first scroll wheel and a second scroll wheel. The first scroll wheel rotates synchronously with the second scroll wheel, an outer diameter of the first scroll wheel is greater than an outer diameter of the second scroll wheel, and the second scroll wheel includes the contact portion.

In one embodiment of the invention, the adjustment portion is a threaded arm, the contact portion is a metal ring, the transmission mechanism is a magnetic element, and the force is a non-contact force. When the adjustment wheel is rotated, the first end of the magnetic element produces a lateral displacement through the threaded arm such that the second end of the magnetic element applies the non-contact force relative to the metal ring.

In one embodiment of the invention, the scroll wheel module further includes a friction plate, sleeved on a side of the scroll wheel relatively adjacent to the second end of the magnetic element, and located between the metal ring and the magnetic element. When the adjustment wheel is rotated, the first end of the magnetic element produces the lateral displacement through the threaded arm such that the second end of the magnetic element applies the non-contact force relative to the metal ring to change a friction force between the metal ring and the friction plate. The friction plate is made of a plastic material.

In view of aforementioned technical solutions, the scroll wheel module of the invention at least includes the following advantages. Based on the above, in the design of the scroll wheel according to the invention, when the adjustment wheel is rotated, the first end of the transmission mechanism produces the displacement relative to the adjustment portion of the adjustment wheel such that the second end of the transmission mechanism applies the force to the contact portion of the scroll wheel, and the magnitude of the force is proportional to the rotational force of the scroll wheel. Accordingly, the user is able to adjust the rotational force of the scroll wheel at any time by rotating the adjustment wheel based on demand thereby changing to the different section mode. In short, the scroll wheel module of the invention is capable of adjusting the section feel based on different preferences of the users.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
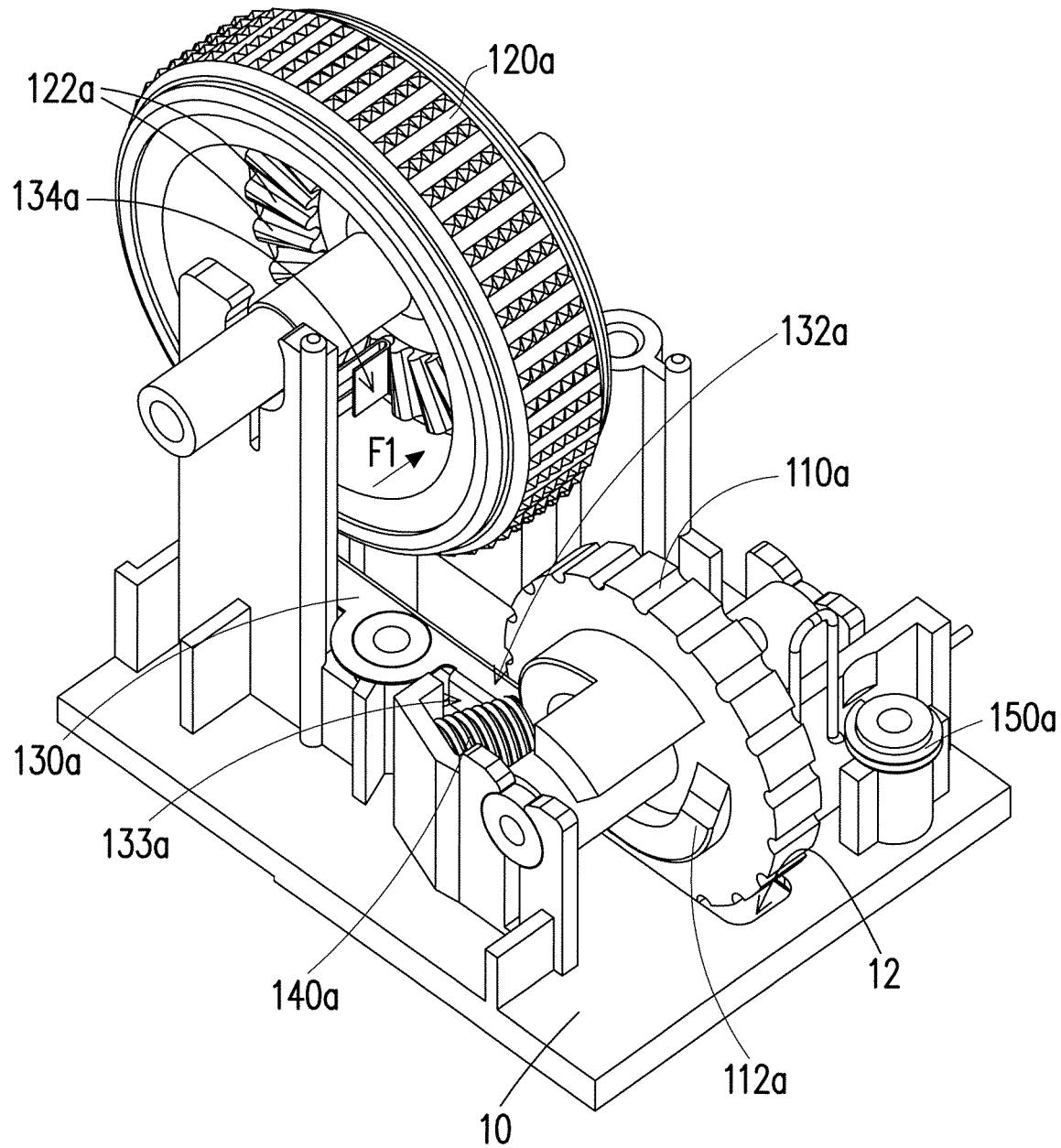
FIG. 1A illustrates a three-dimensional view of a scroll wheel module in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
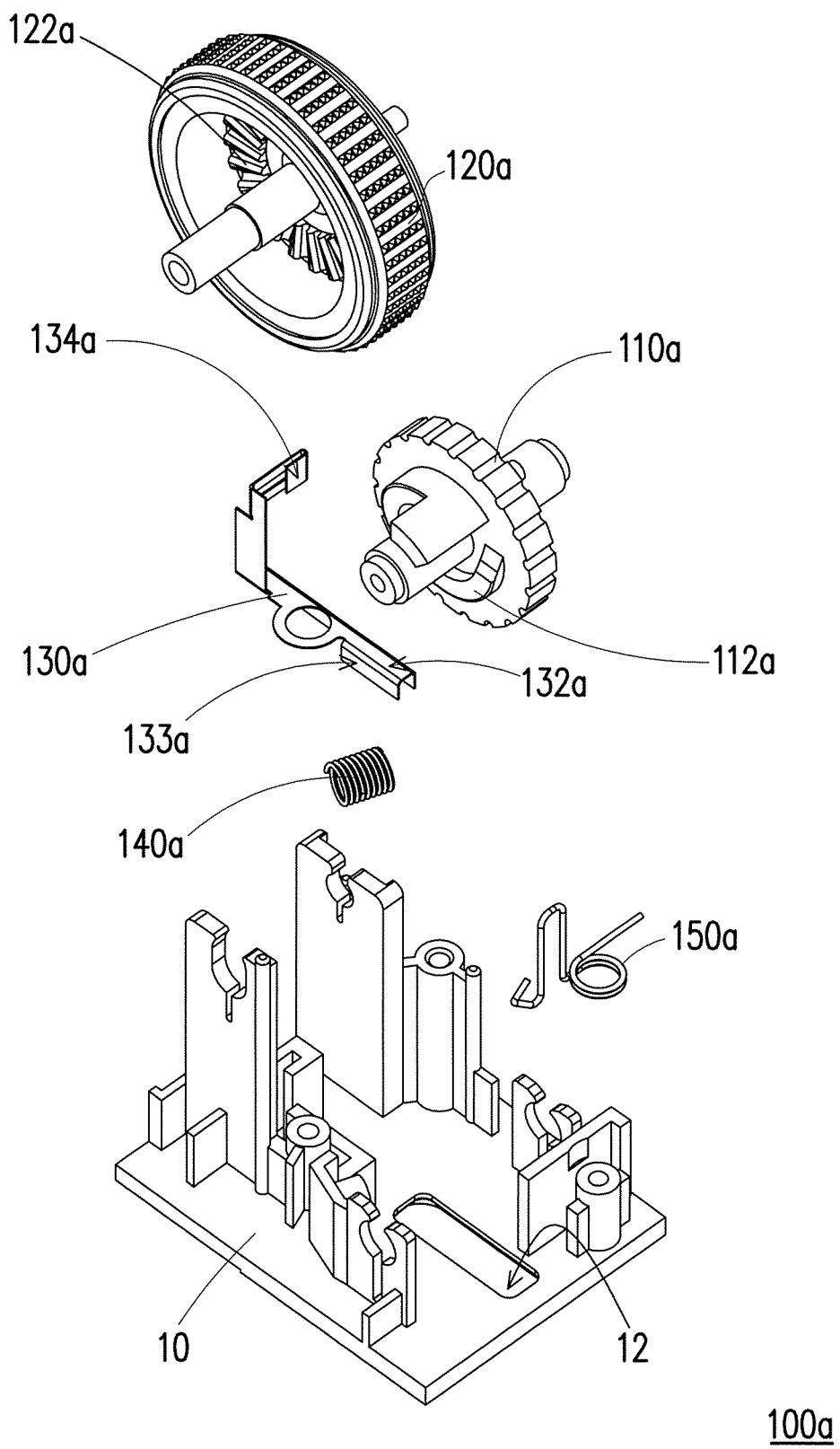
FIG. 1B illustrates a three-dimensional explosion view of the scroll wheel module of FIG. 1A.
Figure 1C:
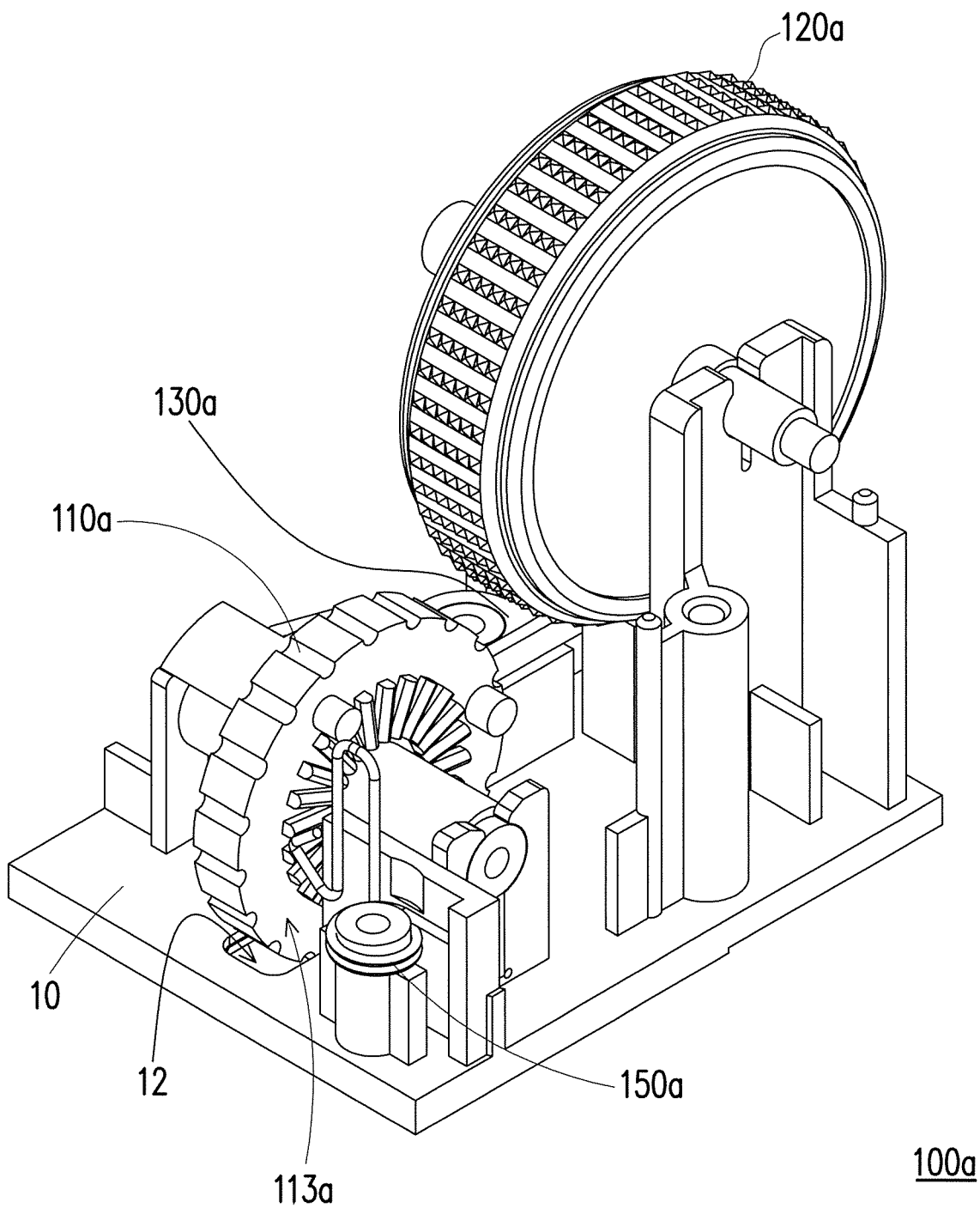
FIG. 1C illustrates a three-dimensional view of the scroll wheel module of FIG. 1A from another viewing angle.

FIG. 1A illustrates a three-dimensional view of a scroll wheel module in an embodiment of the invention. FIG. 1B illustrates a three-dimensional explosion view of the scroll wheel module of FIG. 1A. FIG. 1C illustrates a three-dimensional view of the scroll wheel module of FIG. 1A from another viewing angle. Referring to FIG. 1A, FIG. 1B and FIG. 1C together, in the present embodiment, a scroll wheel module 100a includes an adjustment wheel 110a, a scroll wheel 120a and a transmission mechanism 130a. The adjustment wheel 110a includes an adjustment portion 112a. The scroll wheel 120a includes a contact portion 122a. The transmission mechanism 130a has a first end 132a and a second end 134a opposite to each other, the first end 132a is connected to the adjustment portion 112a of the adjustment wheel 110a, and the second end 134a is adjacent to the scroll wheel 120a. When the adjustment wheel 110a is rotated, the first end 132a of the transmission mechanism 130a produces a displacement relative to the adjustment portion 112a such that the second end 134a of the transmission mechanism 130a applies a force F1 to the contact portion 122a. A magnitude of the force F1 is proportional to a rotational force of the scroll wheel 120a.

In detail, the scroll wheel module 100a of the present embodiment is adapted to be installed on a base 10 of an input device. The input device is, for example, a mouse device, but not limited thereto. As shown in FIG. 1A and FIG. 1B, the base 10 has an opening 12. The adjustment wheel 110a is installed inside the opening 12 and a part of the adjustment wheel 110a is exposed outside the opening 12 so the user can rotate the adjustment wheel 110a using fingers. Herein, the adjustment portion 112a of the adjustment wheel 110a is implemented by an inclined surface. Furthermore, an outside diameter of the scroll wheel 120a of the present embodiment is greater than an outside diameter of the adjustment wheel 110a, wherein the contact portion 122a of the scroll wheel 120a is composed of a plurality of bumps, but not limited thereto. In addition, the transmission mechanism 130a of the present embodiment is implemented by a metal elastic piece. An extending direction of the first end 132a of the transmission mechanism 130a is different from an extending direction of the second end 134a, and the first end 132a and the second end 134a of the transmission mechanism 130a are located on different planes. When the user rotates the adjustment wheel 110a at the opening 12 of the base 10, the first end 132a of the transmission mechanism 130a produces a lateral rotational displacement through the adjustment portion 112a (i.e., the inclined surface) of the adjustment wheel 110a such that the second end 134a of the transmission mechanism 130a applies the force F1 (i.e., a contact force) to and directly leans against the contact portion 122a (i.e., between the bumps) of the scroll wheel 120a.

With reference to FIG. 1A and FIG. 1B, the scroll wheel module 100a of the present embodiment further includes an elastic piece 140a, leaning against a side 133a of the first end 132a of the transmission mechanism 130a. When the adjustment wheel 110a is rotated, the first end 132a of the transmission mechanism 130a produces the lateral rotational displacement through the adjustment portion 112a (i.e., the inclined surface) such that the elastic piece 140a produces an elastic deformation (e.g., compressive or tensile stress) to change the magnitude of the force F1 (i.e., the contact force) applied to the contact portion 122a by the second end 134a of the transmission mechanism 130a. It is noted that, when the adjustment wheel 110a returns to an initial position (e.g., when a rotation angle is 0 degree), the transmission mechanism 130a can also return to an original position through the elastic piece 140a. Herein, the elastic piece 140a is implemented by a spring, but not limited thereto.

In addition, referring to FIG. 1A and FIG. 1C together, the scroll wheel module 100a of the present embodiment further includes a fixing mechanism 150a, leaning against a side 113a of the adjustment wheel 110a relatively far away from the transmission mechanism 130a. When the adjustment wheel 110a is rotated, the first end 132a of the transmission mechanism 130a produces the lateral rotational displacement through the adjustment portion 112a (i.e., the inclined surface) so the fixing mechanism 150a can provide a counter force to fix a position of the adjustment wheel 110a. Herein, the fixing mechanism 150a is implemented by a torsion spring for providing a torque force to reset the adjustment wheel 110a, but not limited thereto.

In brief, the scroll wheel module 100a of the present embodiment changes a degree of the force applied to the scroll wheel 120a by the transmission mechanism 130a by rotating the adjustment wheel 110*a*. Based on a degree of the lateral rotational displacement of the transmission mechanism 130*a*, the second end 134*a* of the transmission mechanism 130*a* can produce the different force F1 (i.e., the contact force, such as a positive pressure) for the contact portion 122*a* of the scroll wheel 120*a* such that different levels of friction force are generated between the transmission mechanism 130*a* and the scroll wheel 120*a*. In this case, when the user turns the scroll wheel 120*a*, if the force F1 is greater, a force required to rotate the scroll wheel 120*a* is also greater, i.e., the section feel is harder; conversely, if the force F1 is smaller, the force required to rotate the scroll wheel 120*a* is also smaller, i.e., the section feel is lighter. This is why the magnitude of the force F1 is proportional to the rotational force of the scroll wheel 120*a*. Based on the above, the user is able to change the rotational force of the scroll wheel 120*a* at any time by rotating the adjustment wheel 110*a* based on demand thereby changing to the different section mode. In this way, the scroll wheel module 100*a* of the present embodiment is capable of adjusting the section feel based on different preferences of the users.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 2A:
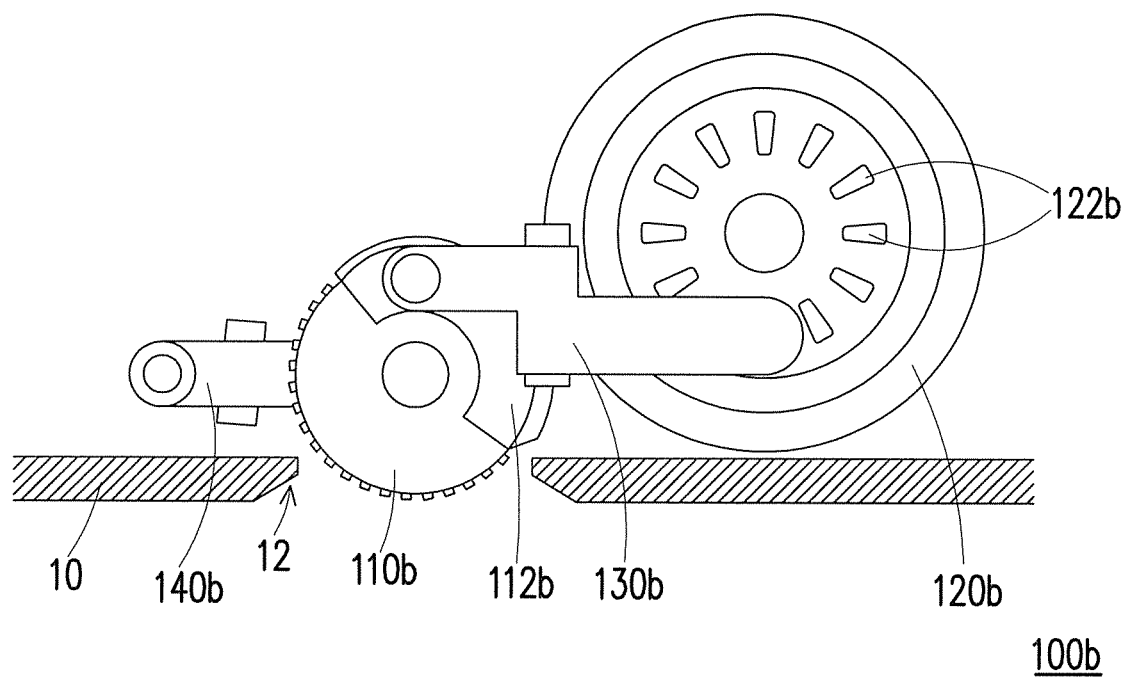
FIG. 2A illustrates a side view of a scroll wheel module in another embodiment of the invention.
Figure 2B:
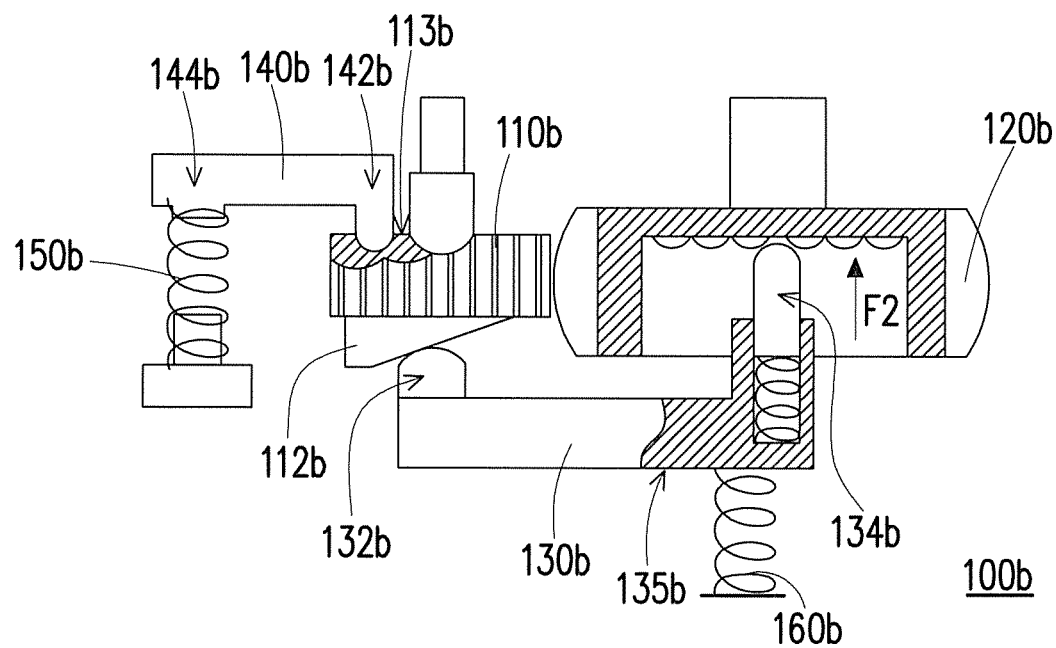
FIG. 2B illustrates a cross-sectional view of the scroll wheel module of FIG. 2A.

FIG. 2A illustrates a side view of a scroll wheel module in another embodiment of the invention. FIG. 2B illustrates a cross-sectional view of the scroll wheel module of FIG. 2A. Referring to FIG. 1A, FIG. 2A and FIG. 2B together, a scroll wheel module 100*b* of the present embodiment is similar to the scroll wheel module 100*a* of FIG. 1A, and the difference between the two is that, the scroll wheel module 100*b* of the present embodiment further includes a fixing rod 140*b* and a spring 150*b*, and the fixing rod 140*b* and the spring 150*b* are used to replace the fixing mechanism 150*a* of FIG. 1A.

Specifically, the fixing rod 140*b* of the present embodiment has a first side 142*b* and a second side 144*b* opposite to each other. The first side 142*b* of the fixing rod 140*b* leans against a side 113*b* of an adjustment wheel 110*b* relatively far away from a transmission mechanism 130*b*. The spring 150*b* leans against the second side 144*b* of the fixing rod 140*b*. When the adjustment wheel 110*b* is rotated, a first end 132*b* of the transmission mechanism 130*b* produces a lateral rotational displacement through an adjustment portion 112*b* (i.e., the inclined surface) of the adjustment wheel 110*b*. In this case, the spring 150*b* provides a counter force to fix a position of the adjustment wheel 110*b*. In brief, the fixing rod 140*b* and the spring 150*b* are used as a fixing device of the adjustment wheel 110*b* to fix the position of the adjustment wheel 110*b* in the present embodiment.

In addition, the scroll wheel module 100*b* of the present embodiment further includes an elastic piece 160*b*, leaning against a lateral surface 135*b* of a second end 134*b* of the transmission mechanism 130*b*. When the second end 134*b* of the transmission mechanism 130*b* is relatively far away from a scroll wheel 120*b*, the elastic member 160*b* provides an elastic power to stabilize the transmission mechanism 130*b*. In other words, when the second end 134*b* of the transmission mechanism 130*b* is relatively far away from the scroll wheel 120*b*, the elastic member 160*b* of the present embodiment can keep the transmission mechanism 130*b* at a balanced and stable position. That is to say, when the second end 134*b* of the transmission mechanism 130*b* is relatively far away from the scroll wheel 120*b*, the scroll wheel 120*b* can rotate freely without being interfered by the transmission mechanism 130*b*. Here, the elastic piece 160*b* is, for example, a spring, but not limited thereto.

In brief, the scroll wheel module 100*b* of the present embodiment drives and adjusts an angle of the lateral rotational displacement of the transmission mechanism 130*b* by adjusting a height of the adjustment portion 112*b* (i.e., the inclined surface) of the adjustment wheel 110*b* such that the second end 134*b* of the transmission mechanism 130*b* applies a different force F2 (i.e., the contact force, such as the positive pressure) to the scroll wheel 120*b* thereby changing a rotational force of the scroll wheel 120*b*. Accordingly, the user is able to adjust the rotational force of the scroll wheel 120*b* at any time by rotating the adjustment wheel 110*b* based on demand thereby changing to the different section mode. In this way, the scroll wheel module 100*b* of the present embodiment is capable of adjusting the section feel based on different preferences of the users.

Figure 3A:
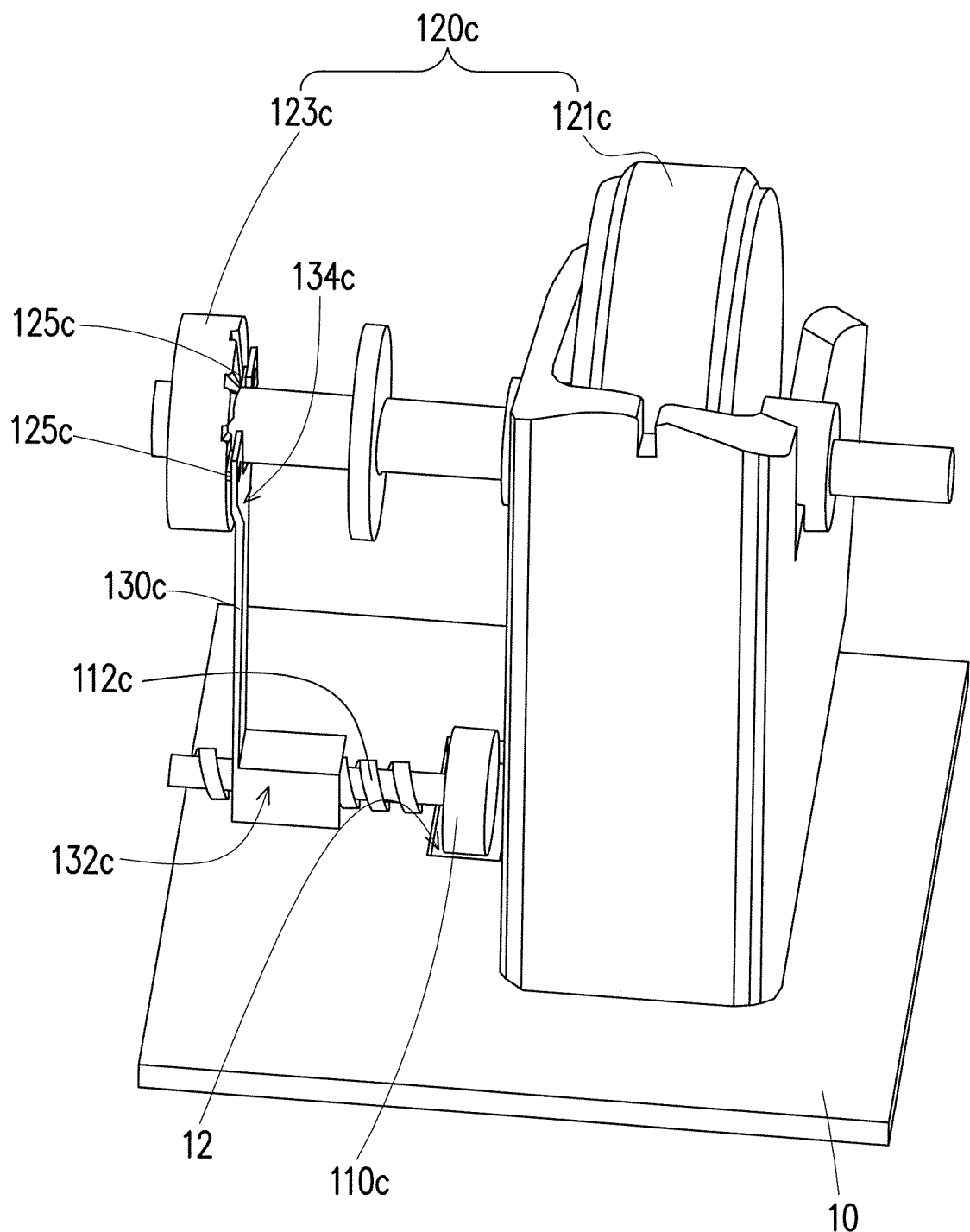
FIG. 3A illustrates a three-dimensional view of a scroll wheel module in another embodiment of the invention.
Figure 3B:
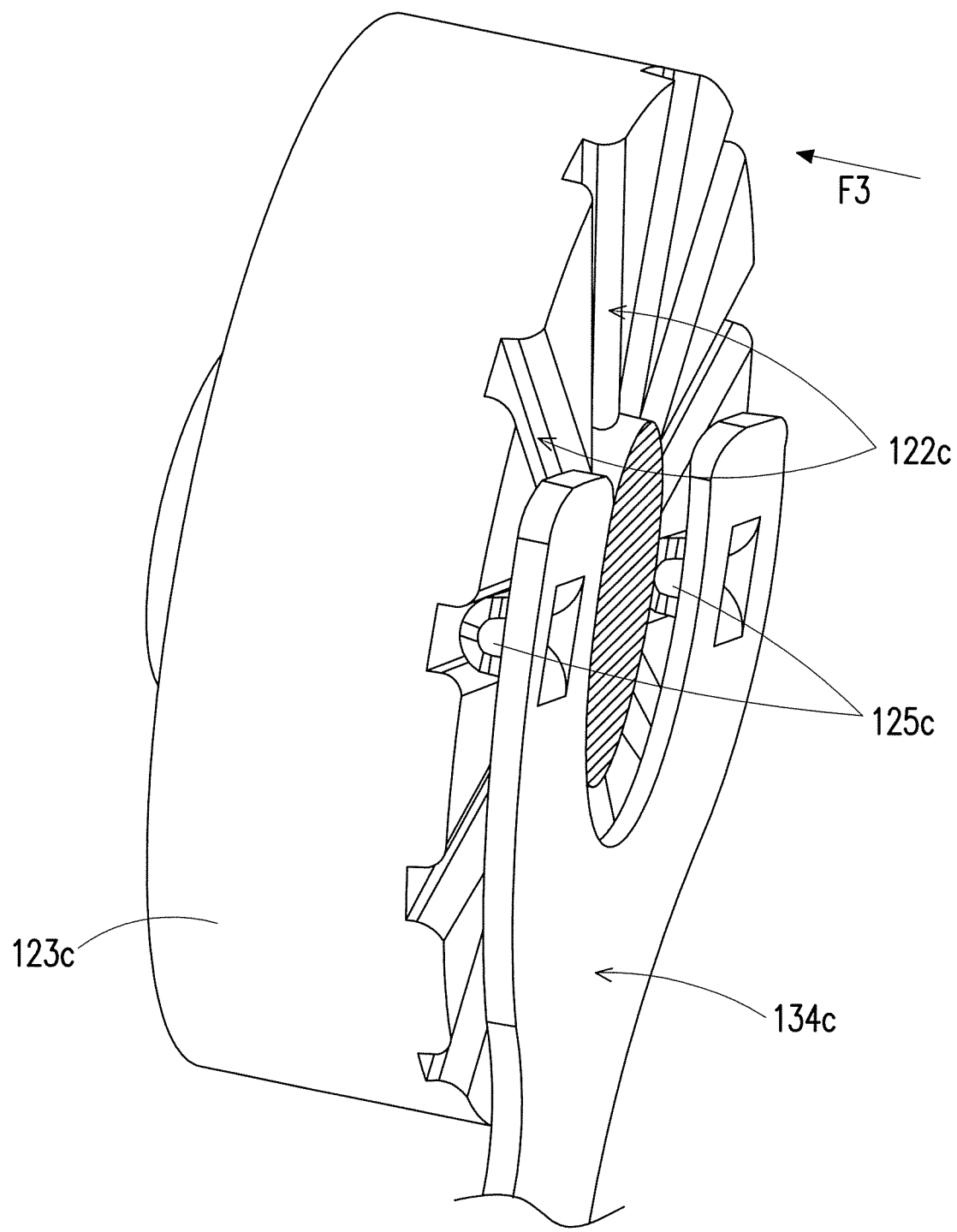
FIG. 3B illustrates a partially enlarged three-dimensional view of the scroll wheel module of FIG. 3A.

FIG. 3A illustrates a three-dimensional view of a scroll wheel module in another embodiment of the invention. FIG. 3B illustrates a partially enlarged three-dimensional view of the scroll wheel module of FIG. 3A. Referring to FIG. 1A, FIG. 3A and FIG. 3B together, a scroll wheel module 100*c* of the present embodiment is similar to the scroll wheel module 100*a* of FIG. 1A, and the difference between the two is that, a scroll wheel 120*c* of the present embodiment includes a first scroll wheel 121*c* and a second scroll wheel 123*c*. The first scroll wheel 121*c* rotates synchronously with the second scroll wheel 123*c*, and an outer diameter of the first scroll wheel 121*c* is greater than an outer diameter of the second scroll wheel 123*c*. The second scroll wheel 123*c* includes a contact portion 122*c*. Herein, the contact portion 122*c* is composed of, for example, a plurality of grooves.

Furthermore, an adjustment portion 112*c* of an adjustment wheel 110*c* is implemented by a threaded arm, and a second end 134*c* of the transmission mechanism 130*c* includes a plurality of friction elastic pieces 125*c*. When the adjustment wheel 110*c* is rotated, a first end 132*c* of the transmission mechanism 130*c* produces a lateral displacement (i.e., a left-right movement) through the adjustment portion 112*c* (i.e., the threaded arm) such that the friction elastic pieces 125*c* apply a force F3 (i.e., the contact force, such as the positive pressure) to and directly push against the contact portion 122*c* of the scroll wheel 120*c* (i.e., into the groove). In this case, the second end 134*c* of the transmission mechanism 130*c* directly leans against the second scroll wheel 123*c* at a horizontal axis position, and the force F3 applied by the transmission mechanism 130*c* acts on a center position of the second scroll wheel 123*c*. Accordingly, at the time when the transmission mechanism 130*c* directly leans against the second scroll wheel 123*c* to generate a friction force, because an acting force of the friction force and a shaft line of the scroll wheel 120*c* are located on the same plane while a pressing force on the first scroll wheel 121*c* pressed by the user is perpendicular to such plane, the ability of the user to press the first scroll wheel 121*c* will not be affected.

In brief, the scroll wheel module 100*c* of the present embodiment drives the transmission mechanism 130*c* to produce the lateral displacement by rotating the adjustment wheel 110*c* such that the second end 134*c* of the transmission mechanism 130*c* applies the different force F3 (i.e., the contact force, such as the positive pressure) to the second scroll wheel 123*c* thereby changing a rotational force of the first scroll wheel 121*c*. Accordingly, the user is able to change the rotational force of the first scroll wheel 121*c* at any time by rotating the adjustment wheel 110c based on demand thereby changing to the different section mode. In this way, the scroll wheel module 100c of the present embodiment is capable of adjusting the section feel based on different preferences of the users.

Figure 4:
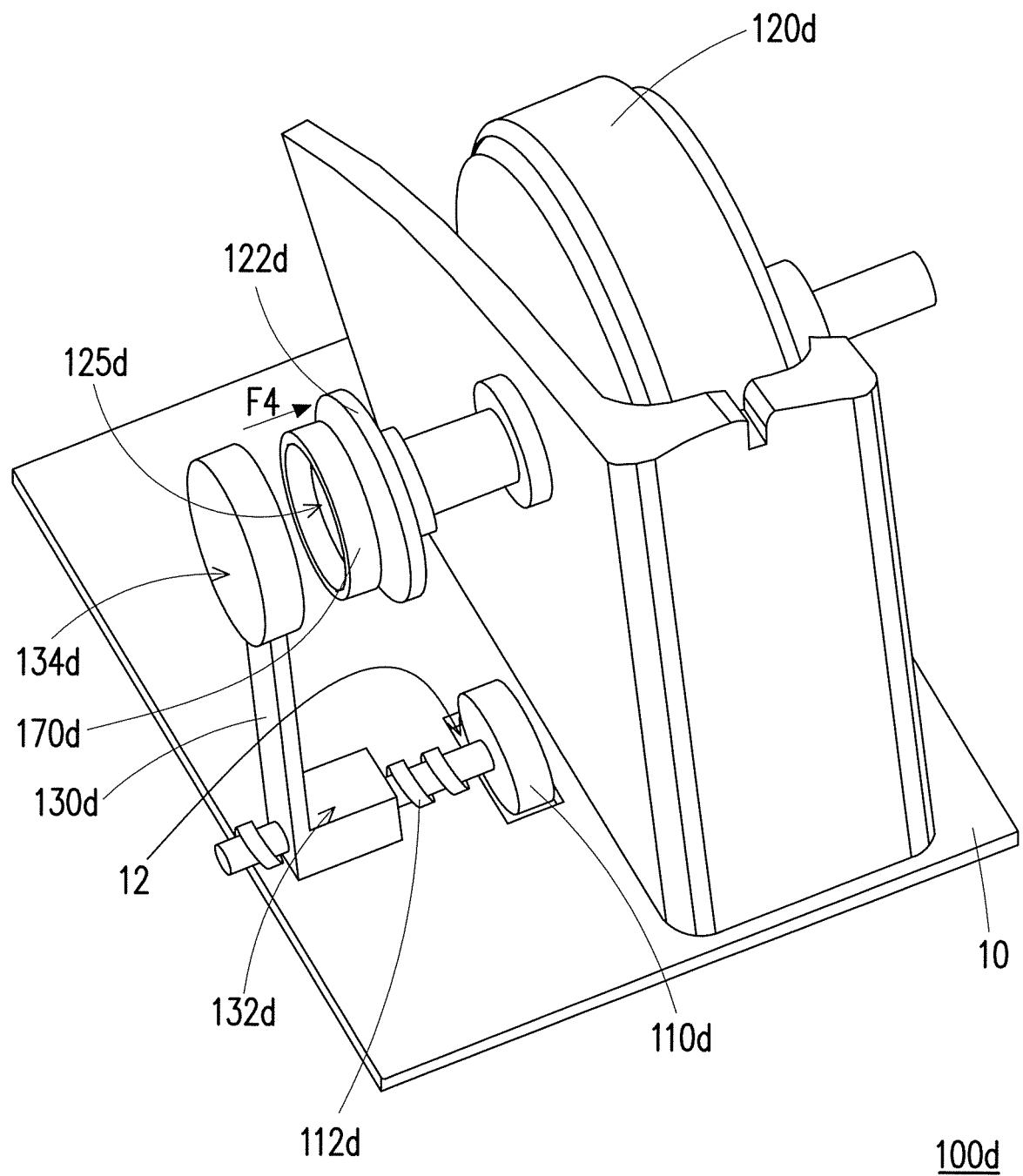
FIG. 4 illustrates a three-dimensional view of a scroll wheel module in another embodiment of the invention.

FIG. 4 illustrates a three-dimensional view of a scroll wheel module in another embodiment of the invention. Referring to FIG. 3A and FIG. 4 together, a scroll wheel module 100d of the present embodiment is similar to the scroll wheel module 100c of FIG. 3A, and the difference between the two is that, a contact portion 122d of a scroll wheel 120d of the present embodiment is a metal ring, and a transmission mechanism 130d is a magnetic element. When an adjustment wheel 110d is rotated, a first end 132d of the transmission mechanism 130d (i.e., the magnetic element) produces a lateral displacement through an adjustment portion 112d (i.e., the threaded arm) of the adjustment wheel 110d such that a second end 134d of the transmission mechanism 130d (i.e., the magnetic element) applies a force F4 (a non-contact force, such as a magnetic force) relative to the contact portion 122d (i.e., the metal ring) of the scroll wheel 120d.

Furthermore, the scroll wheel module 100d of the present embodiment further includes a friction plate 170d, sleeved on a side 125d of the scroll wheel 120d relatively adjacent to the second end 134d of the transmission mechanism 130d (i.e., the magnetic elements), and located between the contact portion 122d and the second end 134d of the transmission mechanism 130d (i.e., the magnetic elements). When the adjustment wheel 110d is rotated, the first end 132d of the transmission mechanism 130d (i.e., the magnetic element) produces the lateral displacement through the adjustment portion 112d (i.e., the threaded arm) of the adjustment wheel 110d such that the second end 134d of the transmission mechanism 130d (i.e., the magnetic element) applies the force F4 (the non-contact force, such as the magnetic force) relative to the contact portion 122d (i.e., the metal ring) of the scroll wheel 120d to change the friction force between the contact portion 122d (i.e., the metal ring) and the friction plate 170d. Herein, the friction plate 170d is made of, for example, a plastic material.

In brief, the scroll wheel module 100d of the present embodiment drive the transmission mechanism 130d (i.e., the magnetic element) to produce the lateral displacement by rotating the adjustment wheel 110d such that the second end 134d of the transmission mechanism 130d (i.e., the magnetic element) applies the force F4 (the non-contact force, such as the magnetic force) to move close to or away from the contact portion 122d (i.e., the metal ring) of the scroll wheel 120d thereby changing a rotational force of the scroll wheel 120d. Accordingly, the user is able to adjust the rotational force of the scroll wheel 120d at any time by rotating the adjustment wheel 110d based on demand thereby changing to the different section mode. In this way, the scroll wheel module 100d of the present embodiment is capable of adjusting the section feel based on different preferences of the users.

In summary, in the design of the scroll wheel according to the invention, when the adjustment wheel is rotated, the first end of the transmission mechanism produces the displacement relative to the adjustment portion of the adjustment wheel such that the second end of the transmission mechanism applies the force to the contact portion of the scroll wheel, and the magnitude of the force is proportional to the rotational force of the scroll wheel. Accordingly, the user is able to change the rotational force of the scroll wheel at any time by rotating the adjustment wheel based on demand thereby changing to the different section mode. In short, the scroll wheel module of the invention is capable of adjusting the section feel based on different preferences of the users.

Lastly, it should be noted that, each of the above embodiments merely serves as an example in the invention instead of limitation thereto. Despite that the invention has been described with reference to above embodiments, it will be apparent to those skilled in the art that various modifications and variations can be made to the structure of the technical content disclosed in above embodiments of the invention without departing from the scope or spirit of the invention. In view of the foregoing, it is intended that the invention cover modifications and variations of this invention provided they fall within the scope of the following claims and their equivalents.

What is claimed is:

1. A scroll wheel module, comprising:
    an adjustment wheel comprising an adjustment portion;
    a scroll wheel comprising a contact portion; and
    a transmission mechanism, having a first end and a second end opposite to each other, the first end being connected to the adjustment portion of the adjustment wheel, the second end being adjacent to the scroll wheel, wherein when the adjustment wheel is rotated, the first end of the transmission mechanism produces a displacement relative to the adjustment portion such that the second end of the transmission mechanism applies a force to the contact portion, and a magnitude of the force is proportional to a rotational force of the scroll wheel.

2. The scroll wheel module as recited in claim 1, wherein the adjustment portion is an inclined surface, and the force is a contact force, when the adjustment wheel is rotated, the first end of the transmission mechanism produces a lateral rotational displacement through the inclined surface such that the second end of the transmission mechanism applies the contact force to and directly leans against the contact portion of the scroll wheel.

3. The scroll wheel module as recited in claim 2, further comprising:
    an elastic piece, leaning against a side of the first end of the transmission mechanism, wherein when adjustment wheel is rotated, the first end of the transmission mechanism produces the lateral rotational displacement through the inclined surface such that the elastic piece produces an elastic deformation to change a magnitude of the contact force applied to the contact portion by the second end of the transmission mechanism.

4. The scroll wheel module as recited in claim 3, further comprising:
    a fixing mechanism, leaning against a side of the adjustment wheel relatively far away from the transmission mechanism, wherein when the adjustment wheel is rotated, the first end of the transmission mechanism produces the lateral rotational displacement through the inclined surface, and the fixing mechanism provides a counter force to fix a position of the adjustment wheel.

5. The scroll wheel module as recited in claim 2, further comprising:
    a fixing rod, having a first side and a second side opposite to each other, the first side leaning against a side of the adjustment wheel relatively far away from the transmission mechanism; and
    a spring, leaning against the second side of the fixing rod, wherein when the adjustment wheel is rotated, the first end of the transmission mechanism produces the lateral rotational displacement through the inclined surface, and the spring provides a counter force to fix a position of the adjustment wheel.

6. The scroll wheel module as recited in claim 5, further comprising:
an elastic piece, leaning against a lateral surface of the second end of the transmission mechanism, and providing an elastic power to stabilize the transmission mechanism when the second end of the transmission mechanism is relatively far away from the scroll wheel.

7. The scroll wheel module as recited in claim 1, wherein the adjustment portion is a threaded arm, the force is a contact force, and the second end of the transmission mechanism comprises a plurality of friction elastic pieces, when the adjustment wheel is rotated, the first end of the transmission mechanism produces a lateral displacement through the threaded arm such that the friction elastic pieces apply the contact force to and directly push against the contact portion.

8. The scroll wheel module as recited in claim 7, wherein the scroll wheel comprises a first scroll wheel and a second scroll wheel, the first scroll wheel rotates synchronously with the second scroll wheel, an outer diameter of the first scroll wheel is greater than an outer diameter of the second scroll wheel, and the second scroll wheel comprises the contact portion.

9. The scroll wheel module as recited in claim 1, wherein the adjustment portion is a threaded arm, the contact portion is a metal ring, the transmission mechanism is a magnetic element, and the force is a non-contact force, when the adjustment wheel is rotated, the first end of the magnetic element produces a lateral displacement through the threaded arm such that the second end of the magnetic element applies the non-contact force relative to the metal ring.

10. The scroll wheel module as recited in claim 9, further comprising:
a friction plate, sleeved on a side of the scroll wheel relatively adjacent to the second end of the magnetic element, and located between the metal ring and the magnetic element, wherein when the adjustment wheel is rotated, the first end of the magnetic element produces the lateral displacement through the threaded aim such that the second end of the magnetic element applies the non-contact force relative to the metal ring to change a friction force between the metal ring and the friction plate, wherein the friction plate is made of a plastic material.

* * * * *